(No Model.)
H. E. RUSSELL, Jr., & H. K. JONES.
WIRE NOTCHING MACHINE.
No. 315,170. Patented Apr. 7, 1885.
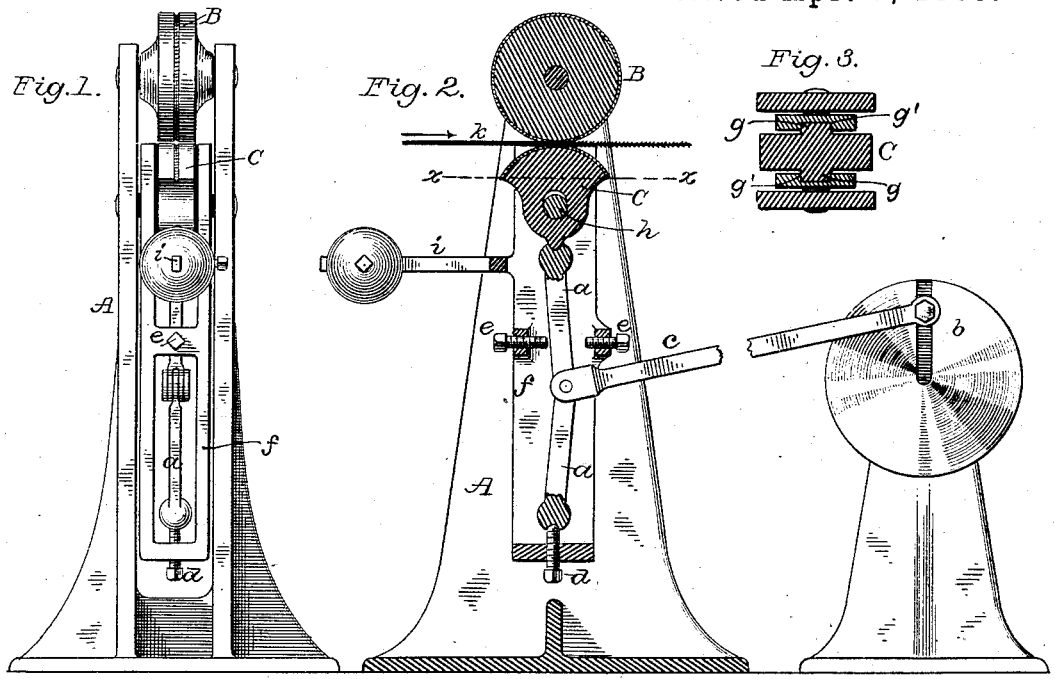
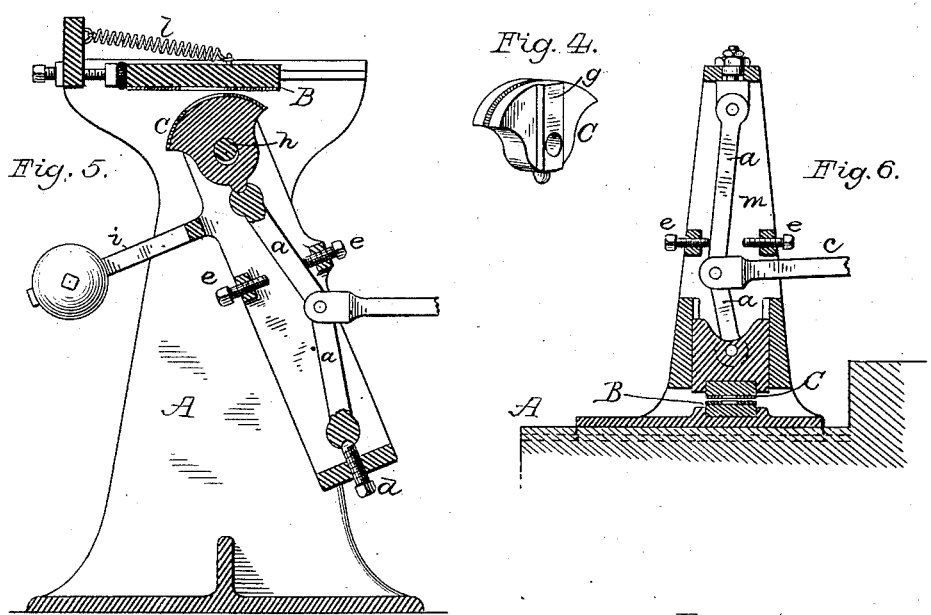
Attest:
Philip F. Larner
Howell Bartle
Inventors:
Henry E. Russell, Jr.
Horace K. Jones.
By McLeod
Attorney.

UNITED STATES PATENT OFFICE.

HENRY E. RUSSELL, JR., OF NEW BRITAIN, AND HORACE K. JONES, OF HARTFORD, ASSIGNORS TO THE RUSSELL & ERWIN MANUFACTURING COMPANY, OF NEW BRITAIN, CONNECTICUT.

WIRE-NOTCHING MACHINE.

SPECIFICATION forming part of Letters Patent No. 315,170, dated April 7, 1885.

Application filed April 14, 1884. (No model.)

*To all whom it may concern:*

Be it known that we, HENRY E. RUSSELL, Jr., of New Britain, in the county of Hartford and State of Connecticut, and HORACE K. JONES, of Hartford, in said county and State, have invented certain new and useful Improvements in Wire-Notching Machines; and we do hereby declare that the following specification, taken in connection with the drawings furnished and forming a part of the same, is a clear, true, and complete description of the several features of our invention.

Machines embodying our improvements are applicable to the notching or roughening of wire, regardless of the uses to which it is to be applied; but we have specially organized our machines for use in connection with the manufacture of what are known as "barbed-wire nails."

Heretofore wire has been notched for the use indicated by means of grooved and laterally-scored rolls between which the wire is passed, and as the wire is variably elongated when thus rolled it is difficult to provide for reserving such plain surfaces on the wire at uniform distances, as are requisite for the production of smooth and symmetrical heads, it being obvious that the notching of the wire must to a greater or lesser extent result in a rough or ragged nail-head.

A machine embodying the main features of our invention is not only capable of readily notching wire, as heretofore, in continuous lengths, but it is also capable of notching the wire in uniform longitudinal sections, and we employ a movable bed-die, and a compressing-die which reciprocates intermittingly toward and from said bed-die, and also moves therewith during the compressing operation, thus operating step by step upon a length of wire, and either notching it from end to end, or with uniformity reserving such plain portions thereof as may be required for developing perfect nail-heads. We are also enabled, by thus providing for uniform action of the dies upon the wire, to so notch or barb it for each nail that for a portion of the length of its shank the barbs will all point toward the tip, and the remainder of the barbs point toward the head, thus producing a novel nail, which, with the novel die for producing the same, is to be hereinafter made the subject of a separate application for Letters Patent by its inventor.

After a detailed description of a machine embodying our improvements and certain modifications thereof, the features deemed novel will be specified in the several clauses of claim hereunto annexed.

Referring to the drawings, Figure 1 is a front view of a machine embodying our improvements in their preferred form. Fig. 2 is a vertical central section of the same. Fig. 3 is a horizontal section of the same, on line *x*. Fig. 4 is a view of the compressing-die detached. Fig. 5 is a central vertical section of a machine having a bed-die in a modified form. Fig. 6 is a central vertical section of a machine having a bed-die similar to that shown in Fig. 5 and a compressing-die in a modified form.

The main frame A of the machine will obviously be varied in its construction according to the particular organization of the active mechanism employed in each case.

Our machines essentially include a bed-die and a compressing-die, and however these may be varied in form or operated, they are essentially grooved, so as to tightly compress wire placed between them, and these grooves are essentially scored laterally or angularly, for imparting to the wire such particular form of notch or barb as may be desired on the shanks of the nails to be made therefrom.

In each instance B denotes a bed-die, and it has essentially a movable surface, or is, in other words, a movable die, and we prefer it, for some lines of service, to be in the form of a disk, as shown in Figs. 1 and 2, although it can obviously be segmental in form, inasmuch as it co-operates with a segmental compressing-die, C, as seen in Figs. 1 and 5, and as said segmental die can only operate to the extent of its curved surface it is obvious that the bed-die, if it have a working-surface of substantially the same length as said curved surface, can be straight, as shown in Fig. 5, instead of curved, as in Fig. 1.

We prefer that the bed-die be placed above the compressing-die; but good results can be obtained if their positions be reversed, as seen, for instance, in Fig. 6, wherein the bed-die B is below the compressing-die C. However these two dies may be shaped, the compressing-die or its working-surface must be capable of not only moving with the bed-die or its working-surface, but also of reciprocating toward and from said bed-die in a line substantially at right angles thereto, as clearly indicated in each of the three organizations shown. In each case the compressing-die C is fitted to guides in which it slides toward and from the bed-die, and in each machine said compressing-die is mounted upon or connected to a toggle-lever, $a$, connected at its joint to a revolving crank-plate, $b$, by means of a pitman or link, $c$, and in each case said toggle-lever at its base is provided with an adjusting abutting screw, $d$, by which the degree of compression may be varied, and in each case the vibratory movement of said toggle-levers is limited or adjusted by means of the oppositely-located lateral abutment-screws $e$. In each of the organizations shown the bed-dies are also moved, at least in one direction, by said crank-plate acting upon the toggle-levers. The vertical or reciprocal movement of the compressing-die toward and from the bed-die is best obtained by means of the toggle-levers, because of their great compressing force with a minimum of friction; but said movement may obviously be obtained by means of an inclined plane or wedge longitudinally reciprocated by the crank-plate and pitman without departure from certain portions of our invention.

In Figs. 1 and 2 the compressing-die is mounted in the upper end of a rocking pendent frame, $f$, and it is supported upon the upper end of the toggle-lever $a$, the lower end thereof having a ball-and-socket bearing upon the round tip of the rotative adjusting-screw $d$, which is tapped into a hole in the lower end of said frame $f$. The compressing-die C has at each side thereof a rib, $g$, which occupies recessed guide-bearings $g'$ in the two inner sides of said frame, near its top, and said die has also an elongated or oval eye loosely occupied by the pivot-bar $h$, by which the frame $f$ is pivotally mounted in the main frame A.

It is desirable that the pendent frame should be capable of swinging and bearing with more or less force against the pitman $c$, and this is provided for preferably by means of a projecting arm, $i$, at the front side of the frame and an adjustable weight thereon, as shown.

It is to be understood that the vibratory movement of the toggle-levers independently of the frame need only be sufficient to slightly move the compressing-die away from the bed-die, so that it can freely move rearwardly after each compression; and it is also to be understood that after said compressing-die has been lifted or advanced toward the bed-die its rocking movement is derived from said crank-plate and pitman pressing against the nearly-straightened toggle-levers, so as to cause the whole or the main portion of the working-surface of the die to move in close compressing-contact with the interposed wire $k$, which is intermittingly carried through the machine by said dies in the direction indicated by the arrow in Fig. 2.

The extent of the vibratory movement of the frame and the consequent rocking movement of the compressing-die is varied by means of the slot in the crank-plate and the pitman-bolt in a manner well known.

In Fig. 5 the compressing-die C is mounted in precisely the same manner as shown in Fig. 1; but the bed-die B co-operating therewith is a sliding die mounted in horizontal guideways, and provided with a retractile spring, $l$, which freely permits said bed-die to move forward with an interposed wire, and also with the surface of the compressing-die, and it returns said bed-die to its rearward position as soon as the compressing-die has been lowered by the releasing-pull of the pitman on the toggle-lever.

Although in the machines shown in Figs. 1 and 5 the bed-dies are capable of independent rearward movement when the segmental dies are depressed, it is obvious that both pairs of dies may be coupled, as by gearing or by a flexible metal strap or straps, in a manner well known, so that a backward movement of the bed-die would be imparted from the compressing-die. If gear-teeth were used, their length should be such that the slight vertical movement of the compressing-die would not cause their disengagement.

In Fig. 6 no pendent frame is required, because the die-frame $m$, in which the toggle-levers and compressing-die C are mounted, also contains the bed-die B, and said frame as a whole slides to and fro in suitable horizontal guideways provided therefor in the main frame A.

As before described, the toggle-levers are first slightly vibrated before the dies are moved either forward or rearward, and, therefore, as in the other forms of machine, the crank-plate and pitman serve as the means for communicating power for notching the wire and feeding it forward, and also for separating the dies and moving the m rearwardly. For preventing the die-frame from sliding too freely in either direction, it may, when necessary, be provided with abutting springs or with friction-plates applied at its guide-bearings.

It is to be understood that the wire as it approaches and as it leaves the dies may be guided and supported in various ways, as upon or between rolls, as is sometimes desirable, without departure from our invention.

The intermitting operation of our machine adapts it to be either operated independently or in front of and in connection with a nail-making machine.

As hereinbefore indicated, the character of the lateral or the angular scores in the dies can be varied without departure from our invention.

As seen in Fig. 1, the dies are scored as for notching the wire continuously; in Fig. 5, as for notching at intervals and having reserved portions, and in Fig. 6 as for shorter reserved portions, and although said dies are each grooved and scored for operating upon a single wire, two or more of such grooves may be employed for operating upon several wires simultaneously.

Having thus described our invention, we claim as new and desire to secure by Letters Patent—

1. The combination, substantially as hereinbefore described, of a movable bed-die, and a compressing-die reciprocating toward and from said bed-die, and moving therewith during its forward movement.

2. The combination, substantially as hereinbefore described, of a movable bed-die, a rocking segmental die mounted in guide-bearings, and mechanism, substantially as described, for moving the segmental die toward and from said bed-die, and for forwardly moving both of said dies, and permitting the compressing-die to rock rearwardly independently of the bed-die, as set forth.

3. The combination, substantially as hereinbefore described, of the two dies, the toggle-lever, and the crank-plate for forcing said dies together, and then moving them forward.

4. The combination, substantially as hereinbefore described, of a segmental die supported on a toggle-lever, a pivoted frame in which said die and lever are mounted, and means, substantially as described, for vibrating said lever and frame, and thereby causing the die to intermittingly rise and fall and to rock to and fro, as set forth.

5. The combination, substantially as hereinbefore described, of the two dies, the toggle-lever and its vibrating mechanism, and the vibrating frame containing one of said dies and said toggle-lever.

6. The combination, substantially as hereinbefore described, of the pivoted circular-faced bed-die, the segmental compressing-die supported on a toggle-lever, a pivoted frame in which said segmental die and the toggle-lever are mounted, and means, substantially as described, for vibrating said lever and frame, for advancing the compressing-die, rocking it, and returning it from the bed-die.

HENRY E. RUSSELL, JR.
HORACE K. JONES.

Witnesses:
THOS. S. BISHOP,
MARTIN S. WIARD.